United States Patent Office 3,304,953
Patented Feb. 21, 1967

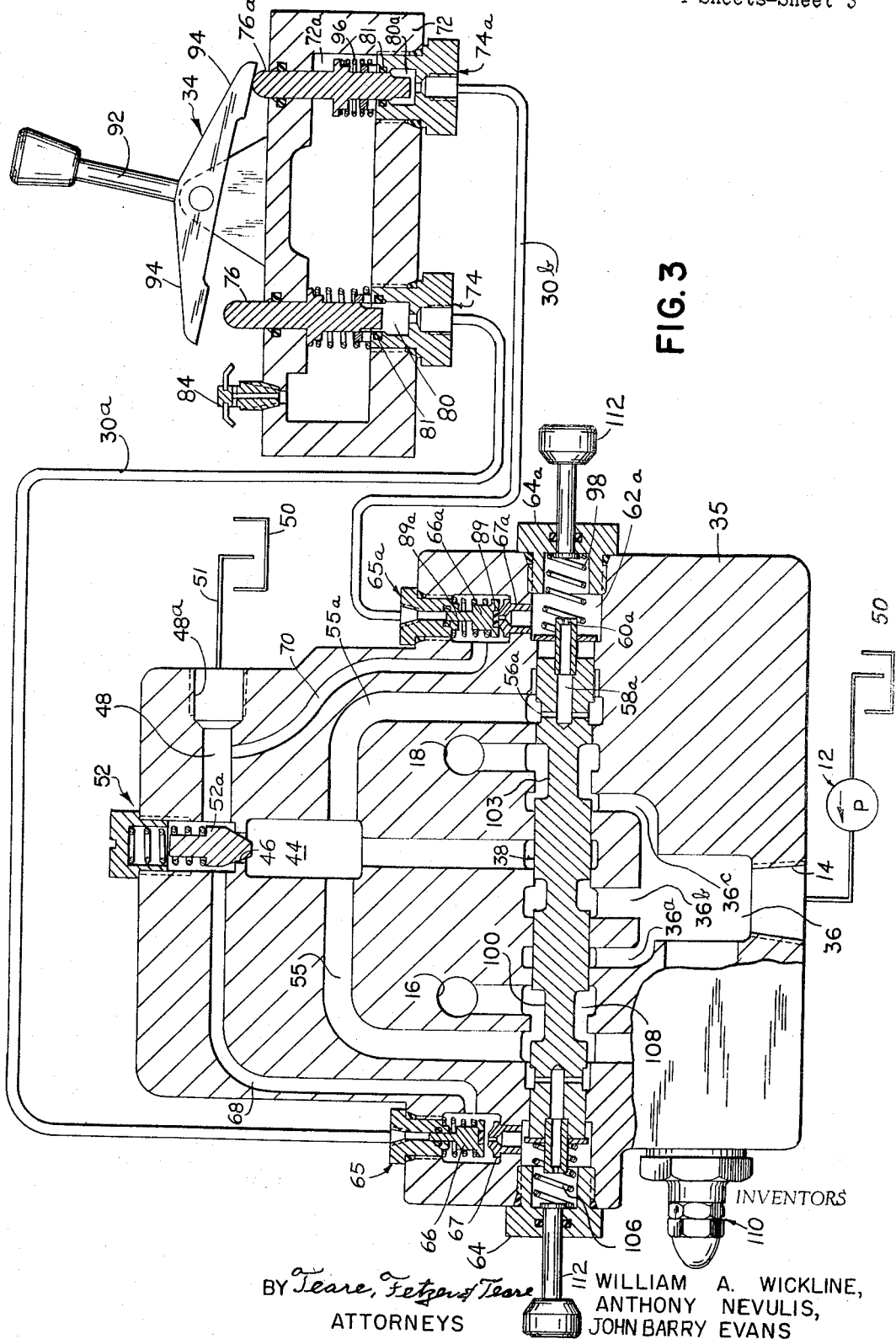

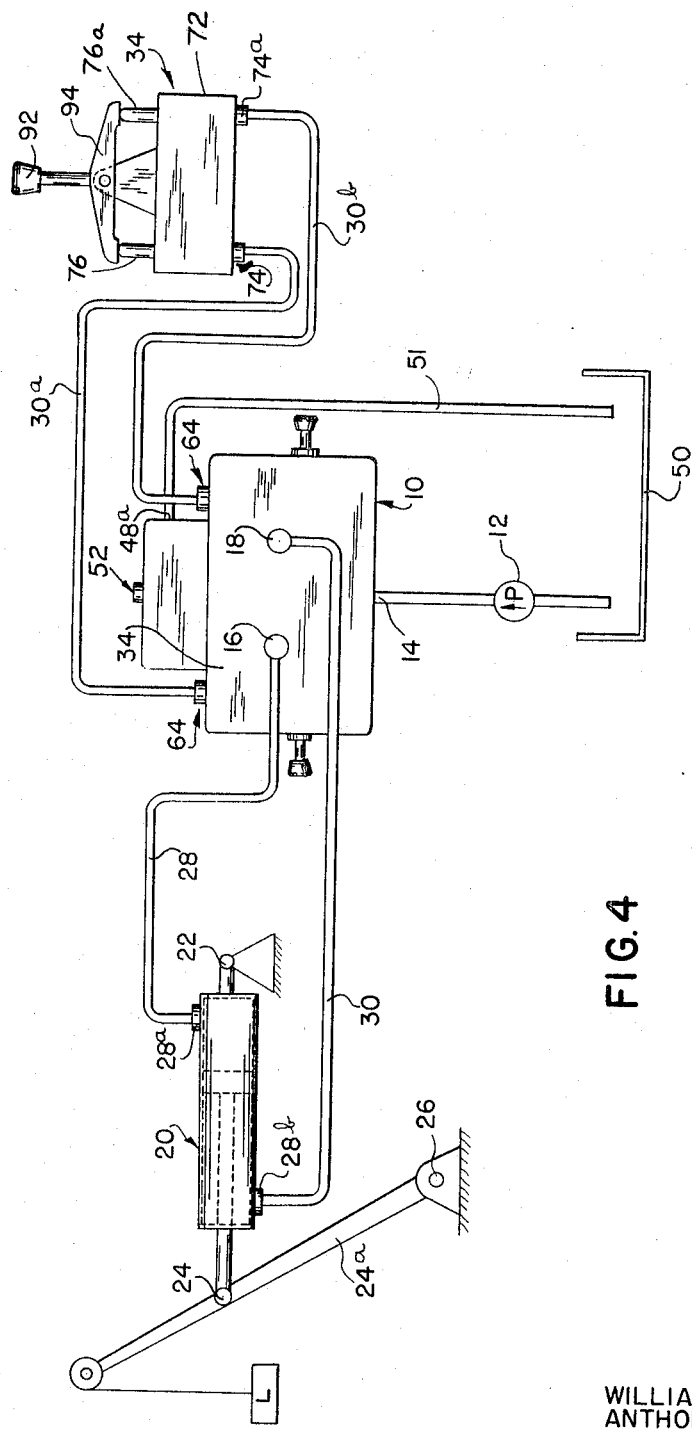

3,304,953
FLUID POWER SYSTEM AND VALVE MECHANISMS THEREFOR
William A. Wickline, Willowick, Anthony Nevulis, Wickliffe, and John Barry Evans, Willoughby, Ohio, assignors to The Ohio Brass Company, Mansfield, Ohio, a corporation of New Jersey
Filed Jan. 2, 1964, Ser. No. 335,190
14 Claims. (Cl. 137—596.12)

This invention relates in general to fluid power systems and more particularly to valve mechanisms for use in fluid power systems, and which valve mechanisms may be remotely controlled.

This system may be used for instance in a machinery arrangement which is actuated by fluid powered motor units or mechanisms, such as for instance fluid powered reciprocal type motor units, and in which the operator must perform the required control functions from a position distant from the mandatory or desirable location of the main control valve for the motor unit or units.

Heretofore this type of remote control function for fluid power equipment has oftentimes been accomplished with electrical mechanisms, which are not generally as reliable as might be desired, and which unduly complicate the control problems, especially in certain environmental settings.

Accordingly, an object of the invention is to provide a novel fluid power system for operating mechanism.

Another object of the invention is to provide a novel fluid power system which includes a remote control arrangement, including a main control valve and a fluid pressure actuator or operator, remotely disposed with respect to the main control valve.

A still further object of the invention is to provide a novel, reciprocal, open center, axially movable, spool-type control valve, for controlling the direction of actuation of an associated reciprocal, fluid powered motor unit, and which valve may be controlled by a remotely disposed fluid pressure actuator or operator, and thus providing for controlling the direction of actuation of the motor unit from a point remote from the control valve by fluid pressure means.

A still further object of the invention is to provide a novel, open center, reciprocal, spool-type directional control valve which embodies fluid control means for ordinarily maintaining the spool of the valve in neutral position, and which also embodies means which is adapted for actuation by a remote fluid pressure actuator for adjusting the second mentioned means and causing hydraulic unbalance of the spool of the control valve, to control the direction of flow of pressurized working fluid through the control valve.

A still further object of the invention is to provide an open center control valve comprising a valve body having a bore extending therethrough, with an axially movable control spool positioned in the bore, and having fluid pressure means including poppet-like check valve means operable on each end of the spool, for normally maintaining the spool in hydraulic balance, and with such check valve means being adapted for connection to a remotely disposed fluid pressure actuator, for varying a selected one of the check valve means as compared to the other of the check valve means, and thereby causing uneven fluid pressure loading of the spool of the control valve, to cause axial actuation of the latter, and thus control of the direction of flow of working fluid through the valve.

Other objects and advantages of the invention will be apparent from the following description, taken in conjunction with the accompanying drawings wherein:

FIG. 3 is a view generally similar to that of FIGS. 1 and 2, but showing the actuator being moved in the opposite direction as compared to that of FIG. 2;

FIG. 4 is a diagrammatic illustration of a possible system which embodies the control mechanism of FIGS. 1 and 3.

Figure 1:
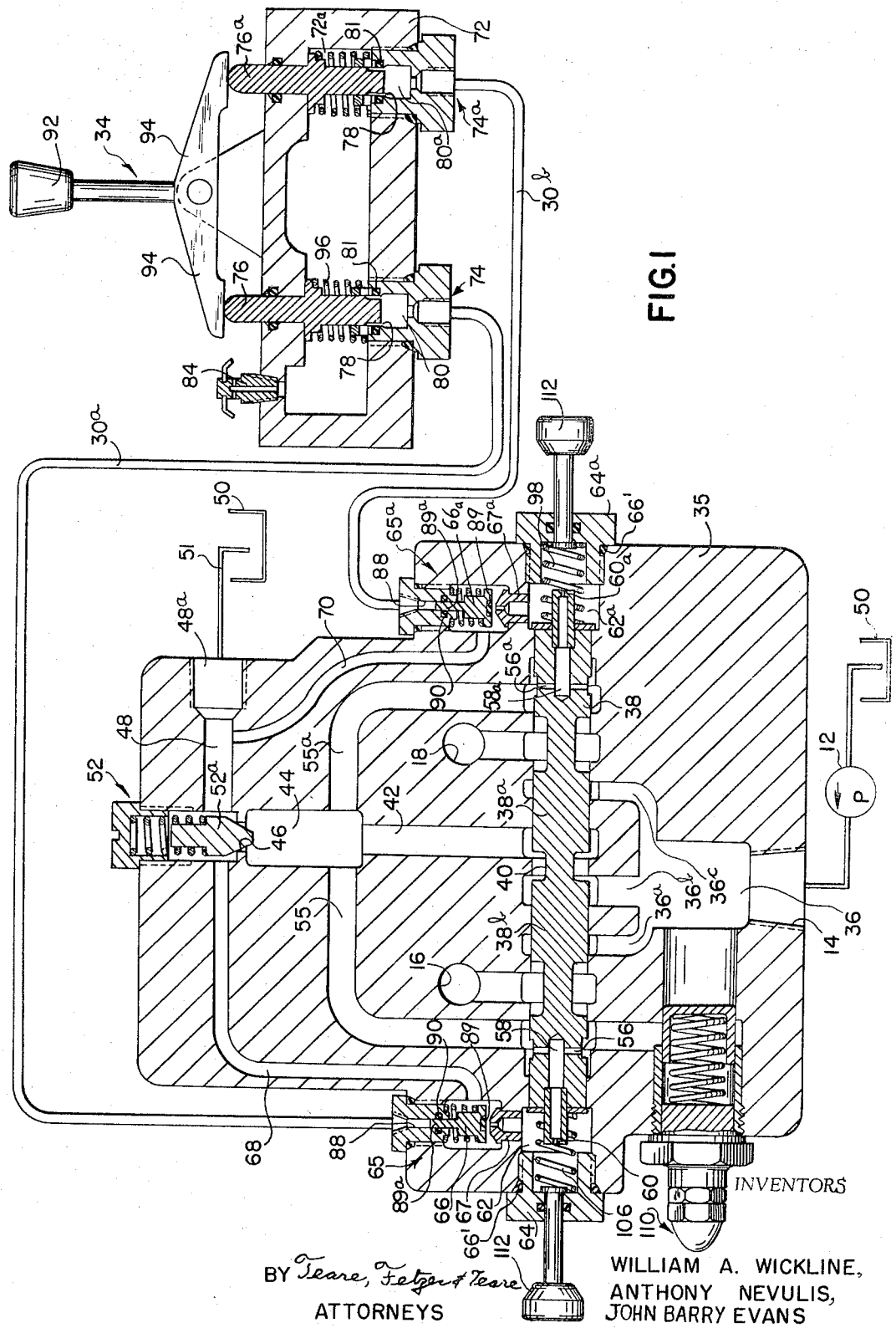
FIG. 1 is a more or less diagrammatic sectional view of a control valve constructed in accordance with the invention, and as coupled by fluid pressure transmission lines to a remotely disposed fluid pressure actuator, for pilot control of the control valve.

Referring now again to the drawings, and in particular to FIG. 4 thereof, there is shown an open center, directional control valve member 10 which is adapted for remote control, and which may be connected to a conventional pump 12, which pump may be of a conventional constant volume type, for furnishing a constant flow of pressurized working fluid to inlet port 14 of the valve 10. Valve 10 also embodies distributing ports 16 and 18, which serve as entry or exit ports to or from motor unit 20, depending on what direction the pressurized fluid is flowing to and from the motor unit. The motor unit 20 may be of the double acting, reciprocal type shown, and may be pivotally attached as at 22 to a support, and pivotally attached as at 24 to a member, such as for instance a boom 24a, which in turn may be pivotally attached, as at 26, to a support. The motor unit 20 is adapted for actuating the boom, and thus moving the boom and associated load L which may be suspended from the boom. Distributing port 16 of the main control valve 10 may be connected by transmission line 28 to port 28a of motor unit 20, while distributing port 18 of the main control valve may be connected by fluid transmission line 30 to port 28b of the motor unit 20.

A pilot actuator 34 may be provided for remotely controlling the actuation of the main valve 10 as will be hereinafter described. Pilot actuator 34 may be connected by means of fluid lines 30a and 30b to the main control valve 10.

Aforementioned entry port 14 in the body 35 of the main valve 10, opens into a chamber 36, which may separate into three spur passageways 36a, 36b and 36c. The spool 38 of the valve is movable axially in a bore or opening preferably extending completely through the valve body as shown, and with land 38a of the spool shutting off working fluid flow from the aforementioned passage 36c, while land 38b of the spool cuts off fluid flow from passage 36a, in the neutral position of the spool as shown in FIG. 1. However, groove portion 40 of the spool permits communication between the aforementioned passageway 36b and passageway 42 in the valve body, in the neutral position of the spool 38.

The passageway 42 communicates with the chamber 44 in the valve body 35, with such chamber having a valve seat 46 communicating chamber 44 with a passageway 48 in the valve body. Passageway 48 exits at exit port 48a with the latter being adapted for connection to the reservoir 50 of the system and as by means of a fluid transmission line 51.

Low pressure relief valve mechanism 52, which includes resiliently loaded member 52a, the latter being adapted for engaging the valve seat 46, normally maintains chamber 44 at some predetermined, relatively low pressure, such as for instance 50 p.s.i., or in other words slightly above atmospheric pressure. This relatively low pressure in chamber 44 of the main valve body will create a flow of pressurized fluid from chamber 44, through passageways 55, 55a, to drill holes 56, and 56a, respectively, adjacent each end of the valve spool 38. From holes 56, 56a, such fluid will flow through drill passages 58, 58a and associated orifices 60, 60a into a respective chamber 62, 62a in the valve body. Each of the chambers 62, 62a is defined in part by an associated cap member 64, 64a, which may be provided with a sealing element 66′, for sealing the respective chamber from the exterior of the valve body.

The low pressure flow from each of chambers 62, 62a passes through a respective poppet-like valve 65, 65a, which includes a spring-loaded valve member 66, 66a, adapted for sealing relation with an associated seat member 67, 67a. The fluid flow passing through the poppet valve 65 flows through the passage 68 in the valve body, around the low pressure relief valve 52 to passage 48, and then to the reservoir 50. The fluid flow through poppet valve 65a flows through passage 70 to passage 48 and then to the reservoir. Since this flow occurs equally at both ends of the spool 38 of the valve 10, the pressures in the chambers 62, 62a are equal, and the spool is maintained in fluid pressure balance and in its neutral position, as shown in FIG. 1.

The aforementioned actuator 34 comprises a reservoir body 72, defining a chamber 72a which is adapted to receive fluid therein, with there being provided a pair, in the embodiment illustrated, of spaced poppet-like valves 74, 74a. Each of the valves 74, 74a may include a spring loaded, reciprocal plunger member 76, 76a, with the leading end of each of the plunger members being preferably tapered or beveled as at 78, for sealing movement into respective chamber 80, 80a. A resilient sealing element 81 is preferably provided adjacent the upper end of each of chambers 80, 80a for contact with the associated plunger. It will be noted that reservoir chamber 72a of actuator 34 is vented to the atmosphere as for instance by plug 84. Each of the chambers 80, 80a is connected by means of a respective one of the aforementioned fluid transmission lines 30a, 30b to a respective one of the poppet valves 65, 65a in the main valve 10, and as shown. Thus each of such lines 30a, 30b communicates with a chamber 88 in the respective poppet valve 65, 65a for the purpose of actuating the respective valve member 66, 66a, as will be hereinafter described in greater detail.

The valve member 66 or 66a of each of the poppet valves 65 or 65a preferably embodies a resilient insert 89 for effective sealing coaction with the respective seat 67, 67a, and an elongated stem section 89a received in sliding relation in the respective chamber 88. As shown, the cross sectional area of each of the plungers 76, 76a is preferably materially greater than the cross sectional area of the stem section 89a of the respective valve member 66 or 66a. Sealing means, such as an O-ring 90, may coact with each of the stem sections 89a for sealing the fluid in each of chambers 88.

Operation of the mechanism may be as follows:

As aforementioned, pressurized working fluid from the pump 12 flows through port 14, chamber 36, groove portion 40 into passageway 42 and chamber 44, and is maintained for instance at a pressure of 50 p.s.i. by the relatively low pressure relief valve 52, which is vented to the reservoir 50 at port 48a. This relatively low pressure in chamber 44 maintains a constant flow of fluid pressure through passages 55, 55a, and into chambers 62, 62a, to maintain the valve spool 38 in neutral position.

Figure 2:
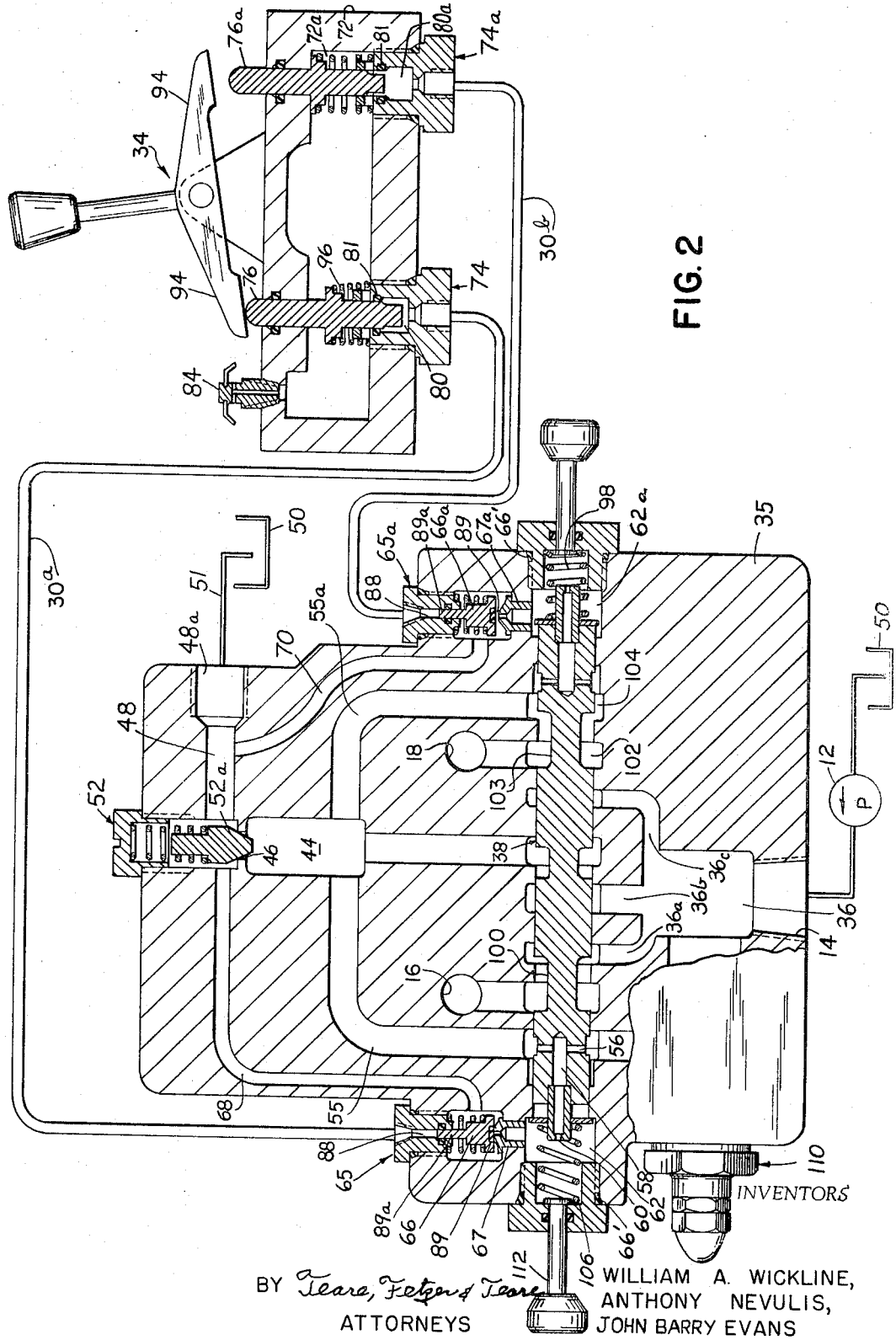
FIG. 2 is a view generally similar to FIG. 1 but illustrating the actuator as moved in one selected direction to unbalance the spool of the control valve, thus shifting it axially to control the direction of flow of pressurized working fluid through the valve.

Now when an operator desires to actuate the motor unit 20 and say for instance that he desires to extend the unit so as to lower the load L from its position illustrated in FIG. 4, the pivotal lever 92 of actuator 34 may be swung to the left (with reference to FIG. 4), from the position shown, thereby depressing the plunger valve 76, by means of rocker arm 94, and against its spring 96 and thereby closing off the chamber 80 from the reservoir chamber 72a of the actuator. Further movement of the plunger valve 76 in the chamber 80 would cause a compression of the fluid in transmission line 30a, thereby applying a pressure to chamber 88 of poppet valve 65, causing seating of valve 66 against the valve seat 67 (FIG. 2). Thus pressurized fluid from passageway 55 flowing through drill passages 58 and 60 into chamber 62 would build up the fluid pressure in the chamber 62 above that existing in chamber 62a causing an unbalanced fluid pressure on the corresponding end of the spool 38 of the main valve, and axial movement of the spool in a direction toward the right (as viewed in FIGS. 1 and 2) against the resistance to compression of spring member 98, and to the position illustrated in FIG. 2 of the drawings.

In such new position of the spool 38, it will be seen that groove 100 of the spool communicates the entry port 14 and chamber 36, and the passageway 36a with distributing port 16, thus pressurizing port 28a of reciprocal motor unit 20, and driving the piston outwardly, to cause pivotal movement of the boom 24a, and the lowering of the load L. Upon outward movement of the piston rod of the motor unit 20, fluid ahead of the piston will pass through port 28b of the motor unit back through fluid transmission line 30 to distributing port 18 of the main valve 10, thence into chamber 102 in the valve body which due to the axial movement of the spool 38 now communicates, via spool groove 103, with chamber 104 (as shown in FIG. 2), and the fluid then flows through passage 55a to chamber 44 and then through the low pressure valve 52 to the reservoir 50.

To reverse the direction of the motor unit 20, or in other words to cause a retraction of the piston rod thereof, the actuator 34 is operated by the operator so as to pivot the control handle 92 to the right (as viewed in FIG. 3). Such pivotal movement of the operating handle 92 to the right causes depression of the plunger member 76a of the actuator, cutting off chamber 80a from the reservoir chamber 72a of the actuator and then compressing the fluid in line 30b similarly to that aforedescribed in connection with pivotal movement of the handle 92 to the left. Such compression of fluid in line 30b causes pressure to be exerted in chamber 88 of poppet valve 65a, and causes downward movement of the valve member 66a into sealing relation with seat 67a, thereby preventing pilot flow of pressurized fluid from chamber 62a and resulting in a build up of pressure in such chamber. This build up of pressure causes unbalanced fluid pressure to be exerted axially on the corresponding end of the spool member 38 in a direction to the left (as viewed in FIG. 3) moving the spool toward the left against the resistance to compression of spring means 106, and positioning of the spool in the general condition illustrated in FIG. 3. It will be seen therefore that fluid pressure from the pump 12 and in chamber 36, enters spur passage 36c, and since the groove 103 in the spool communicates passage 36c with distributing port 18, pressurized working fluid is applied to port 28b (FIG. 4) of the motor unit 20, via the line 30, causing pivotal movement of the boom 24a in a direction toward the right (as viewed in FIG. 4) and lifting of the load L. Fluid behind the piston flows through the port 28a of the motor unit through line 28 to port 16 of the main valve, thence through passage 108 which is communicated via the groove 100 with passage 55 in the valve, and then the pressurized fluid flows through the low pressure relief valve 52, passage 48 to exit port 48a and thence to reservoir.

High pressure relief valve mechanism 110, which may be of the conventional well known cartridge type, may be provided for supplying overload relief protection to the pump 12, and which high pressure relief valve will open at a predetermined relatively high pressure, say for instance 2,000 p.s.i. to communicate inlet chamber 36 with passage 55, chamber 44, low pressure relief valve 52 and thence to reservoir.

Each cap member 64 or 64a is also preferably provided with an axially movable plunger 112 which is adapted to engage the corresponding end of the spool 38 upon predetermined inward movement thereof, and manually shift the spool axially against the resistance of the respective biasing means 98 or 106, thereby providing for direct manual control of the spool..

This system, as illustrated and described, is extremely compact for this particular type of remote control, and the actuator 34 can be placed considerable distances away from the main control valve, say for instance in the magnitude of 100 or 200 feet. Relatively small quantities of fluid or oil are transferred in the pilot lines 30a, 30b so that the device is comparatively temperature insensitive. The system can be operated either remotely from the actuator 34 or may be operated manually at the main valve 10 by means of the plunger members 112.

From the foregoing description and accompanying drawings, it will be seen that the invention provides a novel remote control system and associated control valve mechanism, for readily controlling the movement of an associated motor unit, and a system that is relatively simple and maintenance free in construction and one that is extremely desirable from an economic standpoint.

The terms and expressions which have been used are used as terms of description and not of limitation, and there is no intention in the use of such terms and expressions of excluding any equivalents of any of the features shown, or described, or portions thereof, and it is recognized that various modifications are possible within the scope of the invention claimed.

We claim:

1. A control valve for use in a pressurized fluid power system for controlling the actuation of an associated fluid powered double-acting motor unit comprising, a body, an inlet port in said body, said port being adapted for attachment to a source of pressurized fluid, a pair of distributing ports in said body, each of said distributing ports being adapted for attachment to a respective end of the motor unit, an axially movable spool for controlling the application of pressurized fluid from said inlet port to a selected one of said distributing ports, and the return of pressurized fluid from the motor unit through the other of the distributing ports, fluid pressure means for applying said pressurized fluid at a predetermined relatively low pressure equally to opposite ends of said spool for maintaining said spool in neutral position wherein said distributing ports are cut off from said inlet port, and means for selectively changing the fluid pressure at said opposite ends of the spool, for unbalancing the spool and causing movement thereof to an active position, whereby said pressurized fluid from said inlet port may be applied to a selected one of said distributing ports at a relatively higher pressure than said relatively lower pressure, the last mentioned means including a poppet-like valve member which upon actuation reduces the supply of said pressurized fluid to one end of said spool, and means for applying additional pressurized fluid to the valve member at a pressure lower than said relatively low pressure for actuating the same in a predetermined direction.

2. A control valve for use in a pressurized fluid power system for controlling the actuation of an associated fluid powered double acting motor unit comprising, a housing, an inlet port in said housing adapted for attachment to a source of pressurized working fluid, an outlet port in said housing adapted for attachment to a reservoir, a pair of distributing ports in said housing adapted for attachment to opposite ends of the motor unit, an axially movable spool in said housing controlling the application of pressurized fluid from said inlet port to said outlet port and to and from said distributing ports, a fluid pressure chamber disposed in said housing at each end of said spool, resilient means coacting with each end of said spool for normally maintaining said spool in neutral position wherein said inlet port is communicated with said outlet port and said distributing ports are cut off from said inlet port, a relatively low pressure relief valve means disposed upstream from said outlet port and intermediate the latter and said spool for maintaining a predetermined fluid pressure in said valve housing downstream from said spool, means for applying said predetermined fluid pressure to said pressure chambers on opposite ends of said spool, poppet valves coacting with each of said pressure chambers for maintaining a continuous and equal flow of fluid pressure into and from each of said pressure chambers, and fluid pressure means coacting with each of said poppet valves for actuating the latter in a direction to close off the flow of pressurized fluid from the respective pressure chamber, thereby causing unbalancing of the fluid pressure acting on opposite ends of said spool and movement of said spool to an active position, wherein pressurized fluid from said inlet port may be applied to a selected one of said distributing ports, the last mentioned fluid pressure means comprising a fluid pressure chamber coacting with each of said poppet valves and means for selectively applying fluid pressure to the last mentioned chamber.

3. A fluid power system for actuating a reciprocal double acting fluid powered motor unit comprising in combination, a directional control valve including an inlet port adapted for coupling to a source of pressurized fluid, an outlet port adapted for attachment to a reservoir of fluid, and a pair of distributing ports adapted for attachment to opposite ends of the motor unit, said control valve having a valve recess therein with an axially movable spool in said recess adapted for controlling the application of pressurized fluid from said inlet port to said outlet port and to and from said distributing ports, a fluid pressure chamber located at each end of said spool, means for supplying a relatively low fluid pressure equally to said pressure chambers for maintaining said spool in neutral position wherein said distributing ports are cut off from said inlet port while the latter is connected to said outlet port, valve means having stem portions coacting with each of said pressure chambers for maintaining the pressure therein equal in both of said pressure chambers, and a remotely disposed actuator for controlling the movement of said valve means, said actuator comprising plunger means for pressurizing fluid to provide a signal, the cross-sectional area of said plunger means being substantially greater than the cross-sectional area of the stem portions of said valve means and means for transmitting and applying said pressurized fluid signal to a selected one of said valve means, whereby limited movement of said actuator causes unbalancing of fluid pressure in said pressure chambers and movement of said spool in a direction to connect a selected one of said distributing ports to said inlet port while connecting the other of said distributing ports to said outlet port.

4. In a control valve for a pressurized fluid system comprising, a body, an inlet port in said body for receiving a pressurized fluid, a pair of distributing ports in said body, means in said body for controlling the flow of said pressurized fluid from said inlet to said distributing ports, means in said body for directing said pressurized fluid to maintain a balancing fluid pressure on the first mentioned means for ordinarily maintaining it in one position, and fluid actuatable means for unbalancing the fluid pressure on the first mentioned means for causing it to be actuated to another position, said first mentioned means including an axially movable spool, and said second mentioned means comprising fluid pressure chambers on opposite ends of said spool for receiving said pressurized fluid under relatively low predetermined pressure relative to the pressure of said fluid at said inlet port and applying equalized pressures against opposite ends of the spool, to maintain the spool in said one position, and valve means associated with each of said chambers for maintaining the predetermined pressure in each of said chambers, and including fluid pressure means for selectively controlling by additional fluid pressure the actuation of each of the last mentioned valve means, and thus controlling the pressure in each of said chambers.

5. A control valve for use in a pressurized fluid power system for controlling the actuation of an associated fluid powered double-acting motor unit comprising, a body, an inlet port in said body, said port being adapted for attachment to a source of pressurized fluid, a pair of distributing ports in said body, each of said distributing ports being adapted for attachment to a respective end of the motor unit, an axially movable spool for controlling the application of pressurized fluid from said inlet port to a selected one of said distributing ports, and the return of pressurized fluid from the motor unit through the other of the distributing ports, fluid pressure means for applying a predetermined relatively low pressure equally to opposite ends of said spool for maintaining said spool in neutral position wherein said distributing ports are cut off from said inlet port, and means for selectively changing the fluid pressure at said opposite ends of the spool, for unbalancing the spool and causing movement thereof to an active position, whereby pressurized fluid from said inlet port may be applied to a selected one of said distributing ports, the last mentioned means including a poppet-like valve member, and means for applying pressurized fluid to the valve member for actuating the same in a predetermined direction; a pressurized fluid exit port in said control valve adapted for connection to a reservoir, passageway means communicating said exit port with said spool and with said inlet port, and a low pressure relief valve coacting between said last mentioned passageway means and said exit port for maintaining a predetermined minimum pressure in said last mentioned passageway, and means communicating said last mentioned passageway with said pressure applying means at opposite ends of said spool.

6. In a control valve for a pressurized fluid system comprising, a body, an inlet port in said body, a pair of distributing ports in said body, means in said body for controlling the flow of pressurized fluid from said inlet to said distributing ports, means in said body for a balancing fluid pressure on the first mentioned means for ordinarily maintaining it in one position, and means for unbalancing the fluid pressure on the first mentioned means for causing it to be actuated to another position, an exit port in said body adapted for connection to a reservoir for fluid, means in said body controlled by said first mentioned means for connecting said inlet and exit ports, and low pressure actuated relief valve means coacting with said connecting means for providing pressurized fluid for the second mentioned means.

7. A control valve in accordance with claim 6, including high pressure relief valve means associated with said inlet port for ensuring that the fluid pressure in said valve does not exceed a predetermined maximum.

8. In a fluid power system for actuating a fluid powered motor unit comprising in combination, a main control valve including an inlet port adapted for coupling to a source of pressurized fluid and a pair of distributing ports adapted for coupling to opposite ends of the motor unit, for supplying fluid pressure for actuation of the motor unit, valve means in said control valve for controlling the application of pressurized fluid from said inlet port to said distributing ports, fluid pressure means for applying said fluid at a pressure lower than its pressure at said inlet port for maintaining said valve means in a neutral position whereby said distributing ports are isolated from the pressurized fluid at the inlet port, an actuator for varying additional fluid pressure, and means for transmitting the additional fluid pressure as varied by said actuator to said fluid pressure means, whereby predetermined limited movement of said actuator causes unbalancing of fluid pressure on opposed ends of said valve means and actuation of said valve means to connect a selected one of said distributing ports with said inlet port.

9. A fluid power system in accordance with claim 8, wherein said actuator comprises a reservoir for fluid and plunger means for varying the fluid pressure in said transmitting means.

10. A fluid power system in accordance with claim 8, including high pressure relief valve means coacting with said main control valve to restrict the pressure of the fluid at said inlet port to a predetermined maximum.

11. In a control valve for a pressurized fluid system comprising, a body, an inlet port in said body for receiving a pressurized fluid, a pair of distributing ports in said body, means in said body for controlling the flow of said pressurized fluid from said inlet to said distributing ports, means in said body for directing said pressurized fluid to maintain a balancing fluid pressure on the first mentioned means for ordinarily maintaining it in one position, and fluid actuatable means for unbalancing the fluid pressure on the first mentioned means for causing it to be actuated to another position, said first mentioned means including an axially movable spool, and said second mentioned means comprising fluid pressure chambers on opposite ends of said spool for receiving said pressurized fluid under relatively low predetermined pressure relative to the pressure of said fluid at said inlet port and applying equalized pressures against opposite ends of the spool, to maintain the spool in said one position, and valve means associated with each of said chambers for maintaining the predetermined pressure in each of said chambers and including fluid pressure means for selectively controlling the actuation of each of the last mentioned valve means, and thus controlling the pressure in each of said chambers.

12. In a control valve according to claim 11 wherein the said first mentioned means includes resilient means resiliently opposing the axial movement of said spool in both axial directions.

13. A control valve in accordance with claim 11, wherein said fluid pressure means comprises a chamber for exerting a fluid pressure on said valve means, and means for supplying pressurized fluid to the last mentioned chamber.

14. A valve in accordance with claim 11 including means for manually shifting said spool axially in said body.

References Cited by the Examiner
UNITED STATES PATENTS

| | | | |
|---|---|---|---|
| 124,563 | 3/1872 | Foley | 103—170 |
| 649,739 | 5/1900 | Metcalf | 137—625.66 |
| 2,870,789 | 1/1959 | Bilaisis | 137—625.6 |
| 2,946,196 | 7/1960 | Myers | 60—54.5 |
| 2,973,013 | 2/1961 | Myers | 137—625.62 |
| 3,015,317 | 1/1962 | Buchanan et al. | 137—625.62 |

M. CARY NELSON, *Primary Examiner.*

H. T. KLINKSIEK, *Assistant Examiner.*